US012355668B2

(12) United States Patent
Bouvet

(10) Patent No.: US 12,355,668 B2
(45) Date of Patent: Jul. 8, 2025

(54) TERMINAL THAT CAN BE CONNECTED SIMULTANEOUSLY TO MULTIPLE ACCESS NETWORKS, METHOD FOR DIFFERENTIATING TRAFFIC EMITTED BY THE TERMINAL, DEVICE AND METHOD FOR MANAGING THE TRAFFIC

(71) Applicant: Orange, Paris (FR)

(72) Inventor: Bertrand Bouvet, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 401 days.

(21) Appl. No.: 17/312,358

(22) PCT Filed: Nov. 19, 2019

(86) PCT No.: PCT/FR2019/052739
§ 371 (c)(1),
(2) Date: Jun. 9, 2021

(87) PCT Pub. No.: WO2020/120850
PCT Pub. Date: Jun. 18, 2020

(65) Prior Publication Data
US 2022/0052952 A1     Feb. 17, 2022

(30) Foreign Application Priority Data
Dec. 10, 2018 (FR) ...................... 1872577

(51) Int. Cl.
*H04L 47/125* (2022.01)
*H04L 45/24* (2022.01)
(Continued)

(52) U.S. Cl.
CPC ............ *H04L 47/125* (2013.01); *H04L 45/24* (2013.01); *H04L 47/2408* (2013.01); *H04L 69/22* (2013.01); *H04W 48/18* (2013.01)

(58) Field of Classification Search
CPC ... H04L 47/125; H04L 45/24; H04L 47/2408; H04L 69/22; H04W 48/18
See application file for complete search history.

(56) References Cited

U.S. PATENT DOCUMENTS

| 10,419,982 B1* | 9/2019 | Gundavelli | ............ H04L 45/34 |
| 2009/0016274 A1* | 1/2009 | Nylander | ............ H04W 88/14 |
| | | | 370/328 |

(Continued)

FOREIGN PATENT DOCUMENTS

WO    WO 2012/037666 A1    3/2012

OTHER PUBLICATIONS

International Search Report and Written Opinion dated Mar. 25, 2020 for Application No. PCT/FR2019/052739.

*Primary Examiner* — Thinh D Tran
(74) *Attorney, Agent, or Firm* — Knobbe, Martens, Olson & Bear, LLP

(57) ABSTRACT

A terminal that can be connected simultaneously to multiple access networks including an access network referred to as the "nominal" access network and at least one access network referred to as the "additional" access network is described, as well as a method for differentiating traffic emitted by the terminal, and a device and method for managing the traffic. The method for differentiating emitted traffic includes inserting at least one item of primary tag information into a first field of a packet when the packet is intended to be sent via the additional access network, and sending the packet to a destination device via the additional access network.

12 Claims, 6 Drawing Sheets

(51) Int. Cl.
  *H04L 47/2408* (2022.01)
  *H04L 69/22* (2022.01)
  *H04W 48/18* (2009.01)

(56) References Cited

U.S. PATENT DOCUMENTS

| | | | |
|---|---|---|---|
| 2012/0254464 A1* | 10/2012 | Armstrong | H04L 69/329 709/238 |
| 2015/0011211 A1* | 1/2015 | Plestid | H04W 36/24 455/436 |
| 2015/0201046 A1 | 7/2015 | Biswas | |
| 2017/0006528 A1* | 1/2017 | Bari | H04W 4/00 |
| 2019/0261264 A1* | 8/2019 | Lou | H04W 48/18 |
| 2020/0178196 A1* | 6/2020 | Wang | H04W 48/18 |

* cited by examiner

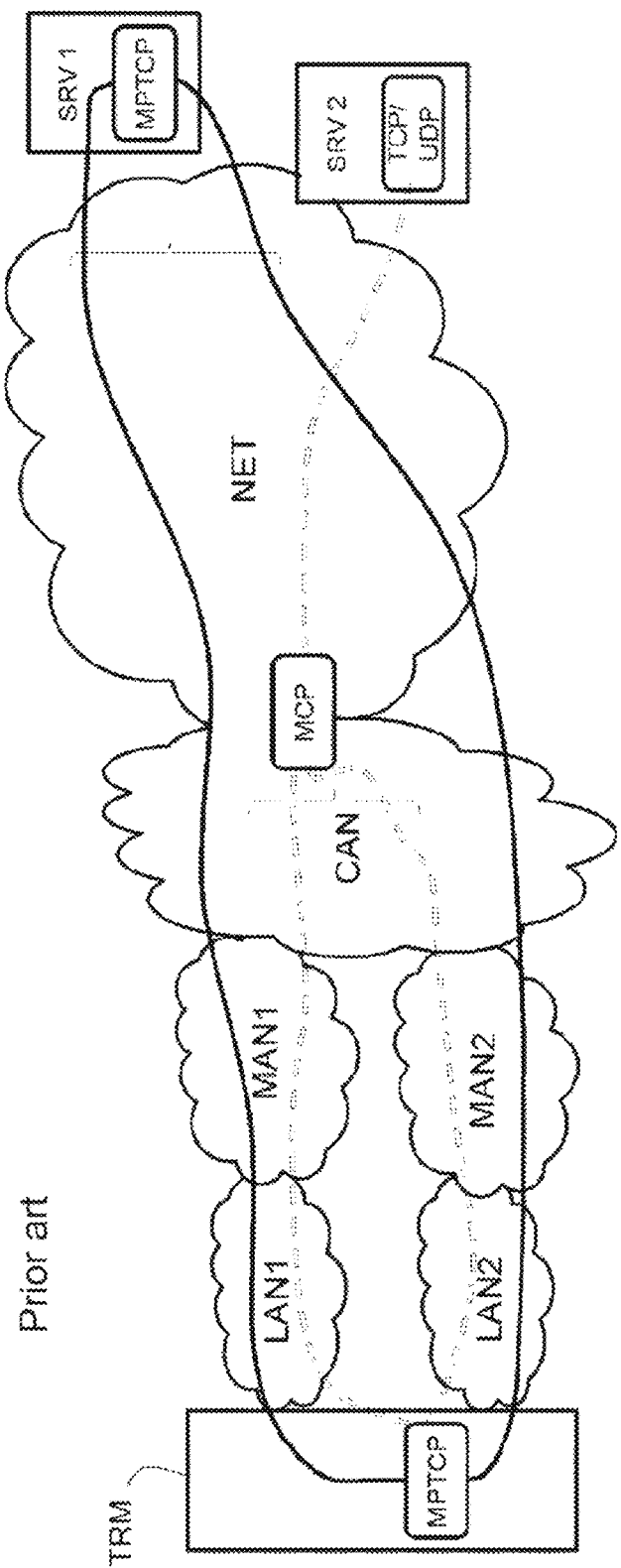
[Fig. 1]
Prior art

[Fig. 2]
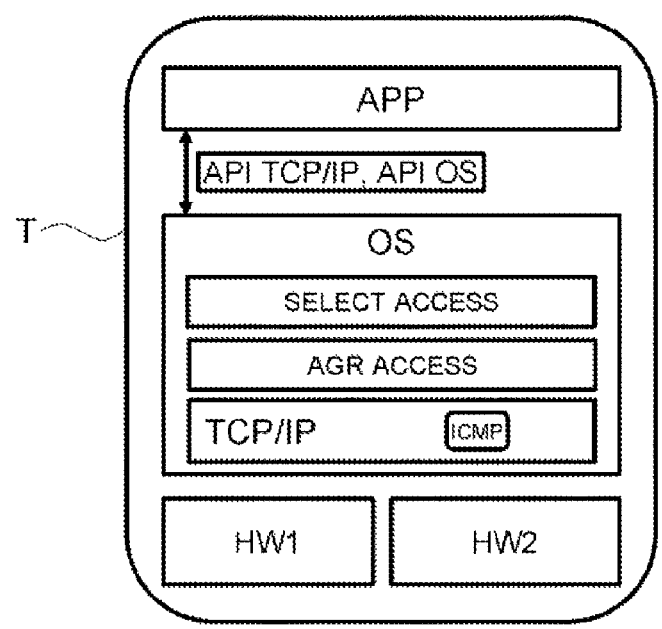
Prior art

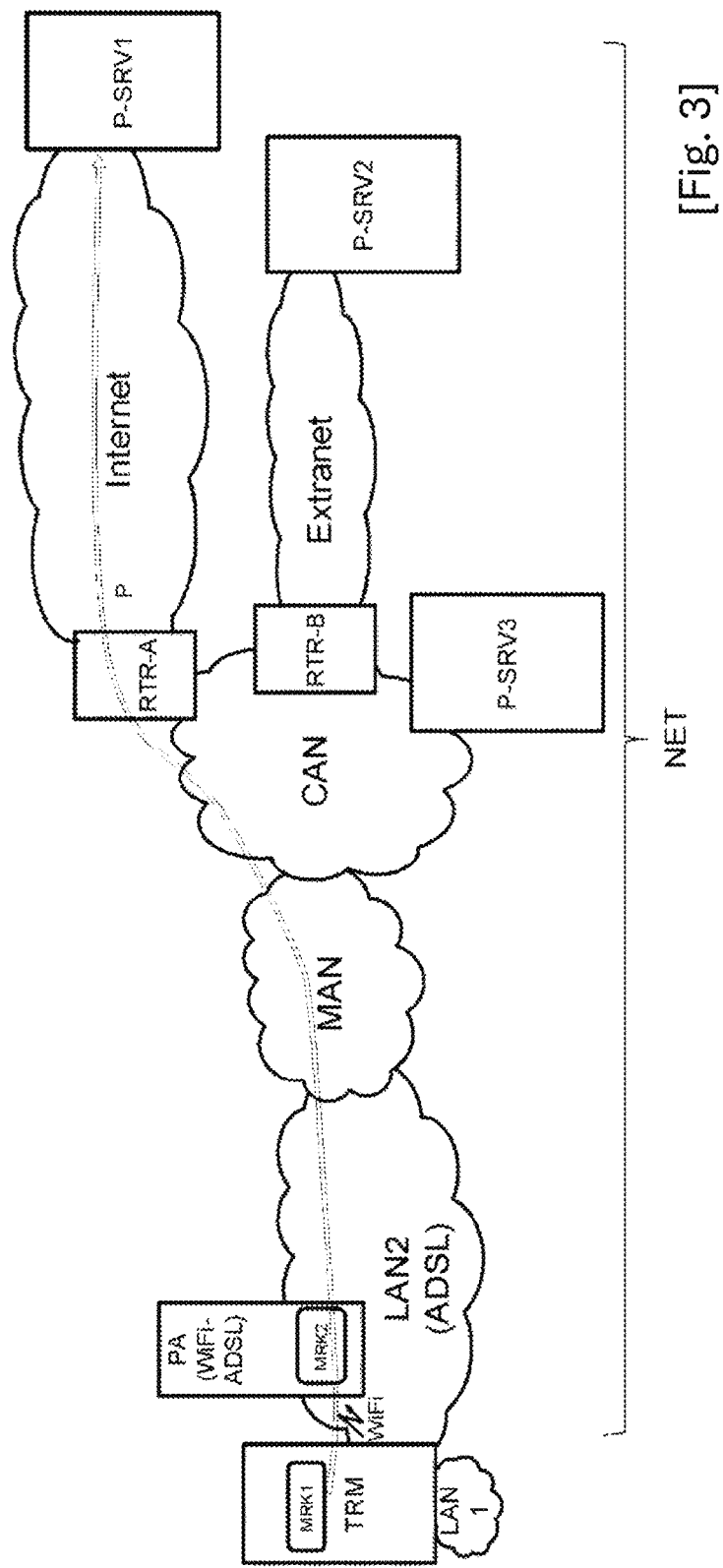

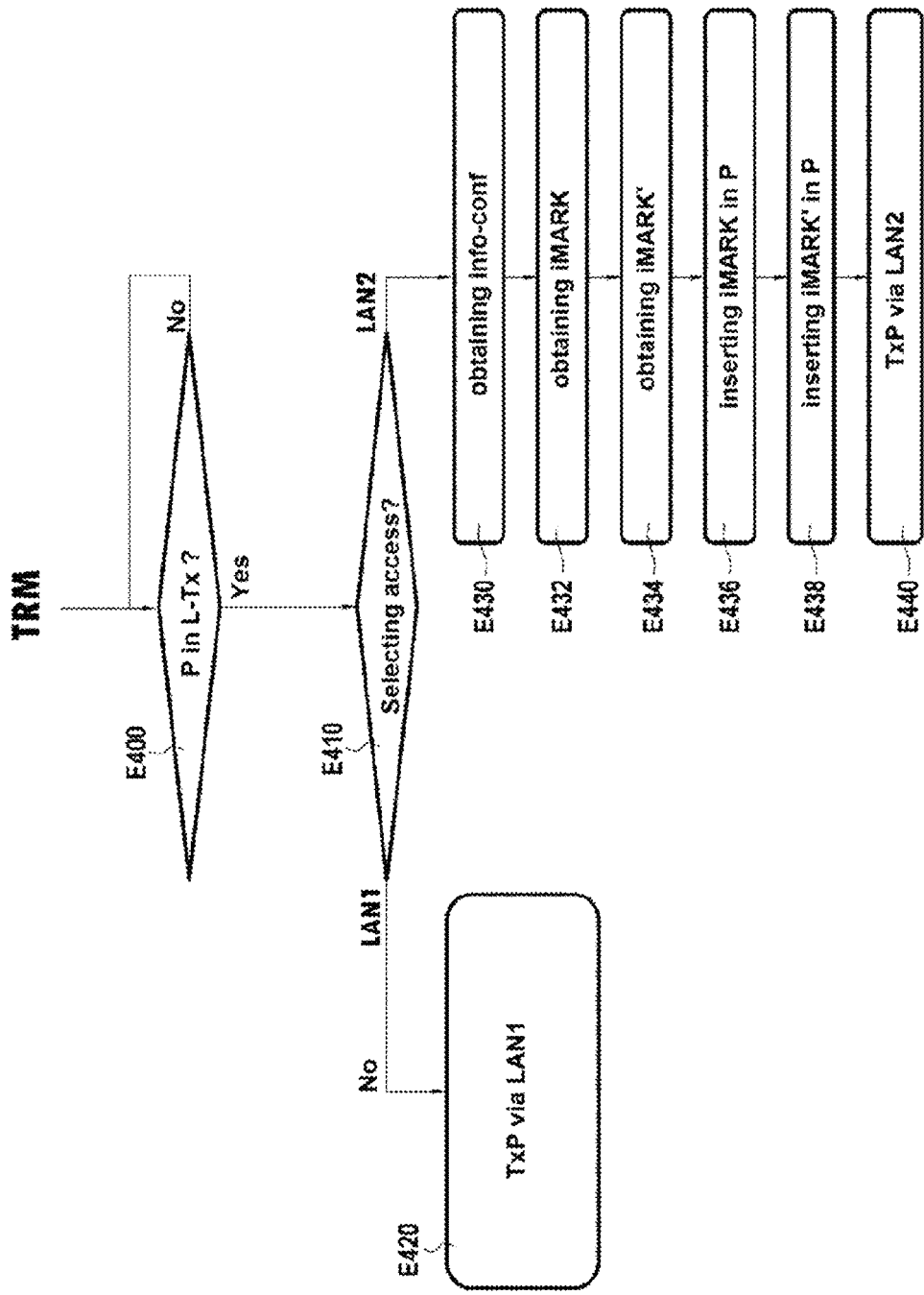
[Fig. 4]

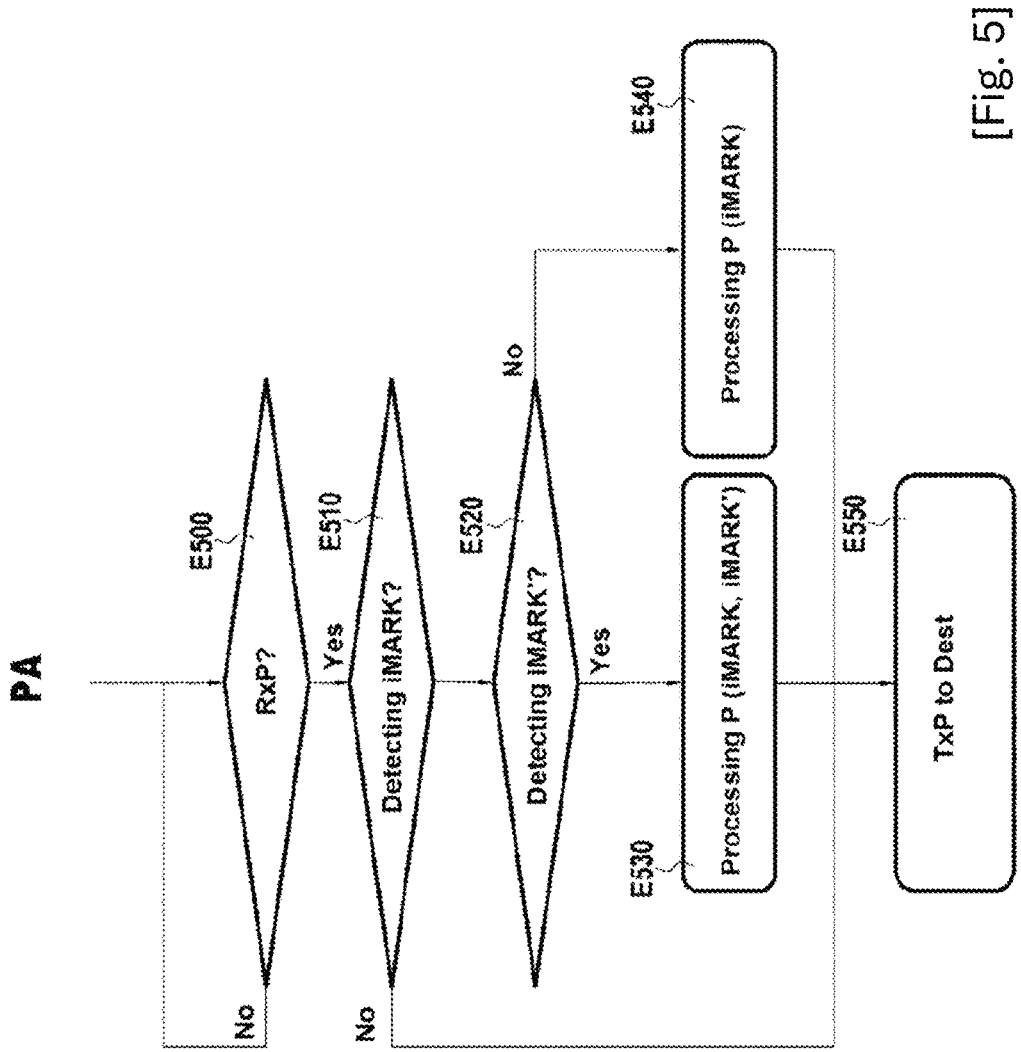

[Fig. 6]
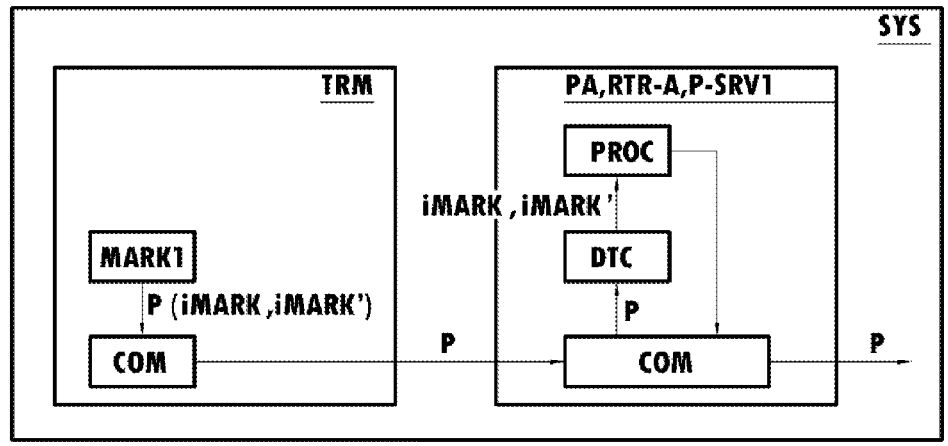
[Fig. 7]
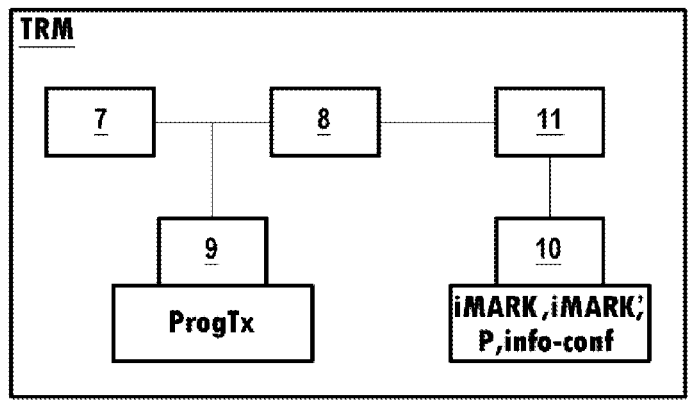
[Fig. 8]
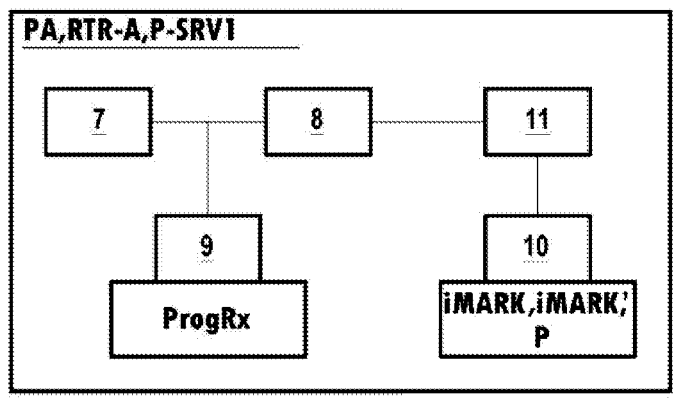

TERMINAL THAT CAN BE CONNECTED SIMULTANEOUSLY TO MULTIPLE ACCESS NETWORKS, METHOD FOR DIFFERENTIATING TRAFFIC EMITTED BY THE TERMINAL, DEVICE AND METHOD FOR MANAGING THE TRAFFIC

RELATED APPLICATIONS

This application is the U.S. National Phase of Application No. PCT/FR2019/052739 entitled "TERMINAL THAT CAN BE CONNECTED SIMULTANEOUSLY TO MULTIPLE ACCESS NETWORKS, METHOD FOR DIFFERENTIATING TRAFFIC EMITTED BY THE TERMINAL, DEVICE AND METHOD FOR MANAGING THE TRAFFIC" and filed Nov. 19, 2019, which claims the benefit of French Patent Application No. 1872577, filed Dec. 10, 2018, each of which is incorporated by reference in its entirety.

PRIOR ART

The invention relates to the general field of telecommunications. It concerns more particularly the field of offloading the communications usually called "offload".

A majority of the terminals currently available on the market can connect to access networks of different technologies, such as a WiFi access network, a wired access network (fiber optic, ADSL or Ethernet network) or a cellular access network (3G, 4G or 5G for example). Such terminals have a module for selecting the access network.

In addition, there are terminals that can be connected simultaneously to two access networks. This functionality is known as "access network aggregation". Such terminals have an aggregation module.

FIG. 1 presents an architecture of a network of the prior art. A terminal TRM having an access network selection module and an aggregation module can alternately or simultaneously connect to two access networks LAN1 and LAN2. The terminal TRM connects to a core network CAN via at least one of the networks LAN1 and LAN2. The network CAN is connected to another network NET. Two servers SRV1 and SRV2 are connected to the network NET. The network NET can be the Internet network. In this example, the network CAN is a core network managed by the same operator as the access networks LAN1 and LAN2.

In the example of FIG. 1, the aggregation module of the terminal TRM deploys the MPTCP (Multi Path Transport Control Protocol) protocol defined by the IETF (RFC6824 standard). Nowadays, the Apple terminals (registered trademark) use this MPTCP protocol. However, to aggregate the traffic between the terminal and a server SRV1 for example, it is necessary that this server SRV1 also supports this same MPTCP protocol.

When the terminal TRM wishes to communicate with a server, SRV2 for example, which does not support the MPTCP protocol, the traffic emitted by the terminal TRM in aggregation on the access networks LAN1 and LAN2, is conveyed to an MCP (MPTCP Convergent Point) equipment which allows ensuring interworking between the MPTCP protocol and a standard TCP/UDP/SCTP protocol supported by the server SRV2. The MCP equipment is a node of the network CAN and it is also connected to the network NET.

The access network aggregation function allows particularly managing the traffic peaks and ensuring the transition of the traffic from one access network to another, the transition may be partial or complete.

There are other technical solutions allowing the selection and/or the aggregation of access networks such as the 3GPP release 13 solution of LWA (LTE WLAN Aggregation) type, the Google BandwidthX solution and the Passpoint solution defined by the WiFi Alliance standardization group (registered trademarks).

FIG. 2 illustrates a software architecture of a terminal T of the prior art, which can be connected simultaneously to several access networks. In this example, the terminal T has two access network interfaces HW1 and HW2. The interface HW1 is an electrical circuit (chipset) of WiFi technology, and the interface HW2 is an electrical circuit (chipset) of cellular radio technology, both circuits being accompanied by their driver software.

An operating system OS is installed above the interfaces HW1 and HW2. A module of a TCP/IP protocol stack is integrated into the operating system OS. The TCP/IP module integrates an ICMP (Internet Control Message Protocol) submodule. Above the TCP/IP module, an access selection module and an access aggregation module (in MPTCP for example) are also integrated without the operating system.

Above the operating system OS, one or more applications APP are installed. These applications rely on interfaces APIs provided by the operating system. Among these APIs, there is the TCP/IP API which allows an application APP to communicate on at least one of the access networks without knowing specifically which access interface HW1 or HW2 is used.

It is noted that an application APP can obtain, via the APIs, information on the state of connectivity with the access networks. In addition, the APIs other than the TCP/IP API can provide the "pull", "push" or "notification" mode applications with the commonly used access network interface, HW1 and/or HW2. Thus, the application APP can adapt its services based on the access network. For example, a voice over IP (VoIP) application installed on a Smartphone-type terminal TRM can emit/receive communications only when the selected access network interface is HW1 of WiFi technology and not the cellular radio access interface HW2.

The terminal providers generally aim at improving the experience of the users. They propose therefore terminals that automatically select the access network proposing a better connection quality, or terminals allowing the user to select the access network(s) to be used.

For the access providers such as the telephone operators, it is preferable that the terminals connecting to their networks, select, if possible, a WiFi or wired access network, rather than a cellular access network. Indeed, the cellular radio resources are limited. In addition, the overall rate of a cellular radio antenna is limited (even by aggregating several frequency blocks and/or by multiplying the number of antennas in MIMO (Multiple Input Multiple Output) technology and/or by improving the encoding and protection algorithms, especially as this rate is shared between several connected terminals. In addition, it will be noted that the bandwidth consumed per user doubles every year with the multiplication of uses, mainly the exchange of video traffic.

However, the access providers cannot monitor or obtain information about the selection or aggregation functions used by the terminals.

A known solution consists in installing on a terminal that can be connected to several access networks, a software application accessible by the access provider, such as the application "Mon réseau" or the application "Orange et moi" (applications provided by the operator Orange). Such an application provides information on the selection or aggregation functions used by this terminal, for example the number of packets emitted on each access network.

However, this solution is not satisfactory, on the one hand because the applications are not compatible with all the operating systems of the terminals, and on the other hand because the users do not always install these applications on their terminals. The access provider therefore has only partial information. In addition, this information is not accessible by service providers.

There is therefore a need for a solution allowing the access providers and the service providers to obtain information on the selection and aggregation functions used by terminals, in order to ensure a good quality of service at these terminals

DISCLOSURE OF THE INVENTION

The invention is aimed at a method for differentiating emitted traffic, implemented by a terminal that can be connected simultaneously to several access networks including a home access network and at least one additional access network different from the home network, said home network being the network that the terminal uses in its default configuration, the method comprising steps of:

inserting at least one primary marking information, interpretable by a device of the network, in a first field of a packet, if and only if the packet is intended to be sent via the additional access network; and
 sending the packet to a recipient device via the additional access network.

Correlatively, the invention is aimed at a terminal that can be connected simultaneously to several access networks including a home access network and at least one additional access network different from the home network, said home network being the network that the terminal uses in its default configuration, the terminal including:

a module for processing emitted traffic, the module being configured to insert at least one primary marking information, interpretable by a network device, in a first field of a packet, if and only if this packet is intended to be sent via the additional access network; and
 communication means configured to send the packet to a recipient device via the additional access network.

Correlatively, the invention is aimed at a method for managing data traffic emitted by a terminal. This method is implemented by a device of a network. This method includes steps of:

receiving a packet from the terminal intended for a recipient device;
 detecting, in a first field of said packet, at least one primary marking information constituting an indication that the packet has been sent via an additional access network for said terminal, the terminal not using said additional access network in its default configuration;
 processing the packet based on the primary marking information; and
 sending the packet to the recipient device.

Correlatively, the invention is aimed at a device of a network for managing data traffic emitted by a terminal, the device including:

communication means configured to receive a packet from the terminal intended for a recipient device;
 detection means configured to detect, in a first field of the packet, at least one primary marking information constituting an indication that the packet has been sent via an additional access network for the terminal, the terminal not using said additional access network in its default configuration; and
 a processing module configured to process the packet based on the marking information;
 the communication means being further configured to send the packet to the recipient device.

The characteristics and advantages of the differentiation method according to the invention presented below apply in the same way to the terminal according to the invention, to the management method according to the invention, to the management device according to the invention and vice versa.

In accordance with the invention, the terminal can be a Smartphone-type mobile telephone, a computer, a tablet or any other communicating device configured to be connected simultaneously to two access networks or more.

Within the meaning of the invention, a "home" access network relating to a terminal is the network that the terminal uses in its default configuration, the latter being for example provided by the provider of this terminal. The "additional" network relating to this terminal is another access network different from the home network, and to which the terminal can connect.

For example, for a mobile telephone or a tablet with an active SIM (Subscriber Identity Module) card, the home network can be a cellular access network, while the additional network can be a WiFi access network. For a computer, the home network can be a wired fiber optic access network, while the additional network can be a WiFi access network or an ADSL wired access network. For a tablet without a SIM card, the home network may be a WiFi access network.

In one embodiment, the terminal according to the invention is a mobile telephone or a tablet with an active SIM card. The home access network is a cellular access network, for example of the 3G, 4G or 5G type. The additional access network is a WiFi or Bluetooth access network.

In another embodiment, the terminal in accordance with the invention is a computer. The home access network is a wired access network, for example of Ethernet, ADSL or fiber optic type. The additional access network is a WiFi access network.

Within the meaning of the invention, the packets emitted by a terminal via its additional access network are packets emitted in offload mode. The packets emitted by a terminal via its home access network are packets emitted in nominal mode.

In a accordance with the invention, the primary marking information, inserted in said first field of the packet, is an indication that this packet is intended to be sent by the terminal via the additional access network, that is to say in offload mode. This primary marking information is interpretable by a device of the network.

The invention allows an access provider or the administrative entity managing a determined access network to distinguish, by the primary marking information:

the packets emitted in a nominal mode (this access network constitutes the home network of the terminals that emitted these packets)
 the packets emitted in offload mode (this access network constitutes the additional network of the terminals that emitted these packets).

Thus, the access provider or the administrative entity managing the access network can apply different packet processing policies, these policies being implemented by the management device in accordance with the invention during the processing step of the management method in accordance with the invention. The distinction of the packets emitted in nominal mode from the packets emitted in offload mode allows an operator of an access network to better manage his network, for example in terms of network dimensioning or offered services.

By way of example, the invention allows promoting, at an access point for an access network, the packets emitted in nominal mode over packets emitted in offload mode, by classifying them in two different queues of which one queue has priority over the other. Indeed, a WiFi access point can favor traffic emitted by a tablet that does not have a SIM card, over traffic emitted by a mobile telephone that can connect to a cellular access network.

The distinction of the packets emitted in nominal mode from the packets emitted in offload mode also allows performing statistics on the number or percentage of the packets emitted in nominal mode or in offload mode. These statistics can be used to dimension access networks, to anticipate evolutions of a network, to propose new functionalities of connection to a network, to adapt the quality of service offered by a network, and/or to establish charging policies.

It should be noted that in accordance with the prior art, only the terminal can qualify a packet emitted in nominal mode or in offload mode. The invention allows providing this qualification to the network as well.

In one embodiment, the differentiation method according to claim 1 further includes a step of inserting complementary marking information, interpretable by a device of the network, in a second field of the packet.

In accordance with the invention, the complementary marking information is inserted as a complement to the primary marking information, and it includes additional information thereto. The complementary marking information relates to the fact that the packet is intended to be sent via the additional access network, in offload mode.

In this mode, the processing module of the terminal in accordance with the invention is further configured to insert the complementary marking information in the second field of the packet.

Thus, the primary marking information is accompanied by the complementary marking information to provide clarifications relating to the use of the additional network. This complementary marking information is also interpretable by a device of the network. The primary marking information and the complementary marking information are inserted to be communicated to a device of the network, such as a management device according to the invention.

In a similar embodiment, the management method further includes a step of obtaining at least one complementary marking information of a second field of the packet, the packet being further processed based on this complementary marking information.

In this embodiment, the detection means of the management device in accordance with the invention are further configured to obtain the complementary marking information for the second field of the packet, the processing module of the management device being configured to process the packet further based on this complementary marking information.

The invention thus allows differentiating the packets send in offload mode (all including primary marking information) from each other, by the complementary information.

This mode allows having several packet processing granularities based on the complementary information. Particularly, this mode allows performing finer statistics thanks to the complementary information.

In one embodiment, the complementary marking information includes at least one information among:
  a type of the home access network (cellular, satellite, fiber optic, xDSL, Ethernet network, or the like);
  an identifier of the home access network (for example an MNC, Mobile Network Code, type identifier);
  a reason for using the additional access network;
  an identifier of the country of the home access network (for example an MCC, Mobile Country Code, type identifier); and
  an identifier of an administrative entity of the home access network.

Thus, information of different kinds can be used for the processing of the packets.

The MNC and MCC type identifiers can be extracted via API interfaces of a SIM card or an eSIM card of the terminal, by low-level protocol layers such as the TCP/IP stack, or by the terminal access selection module, or by the terminal access aggregation module.

In one embodiment where the home network is a cellular network, the complementary marking information may include an identifier of the cellular network country having supported the terminal as well as an identifier of the network operator having supported it. This information can be used to identify whether the terminal is in Home or Roaming situation.

In one embodiment, the processing step includes a storage, by the management device, of the primary marking information and/or of the complementary marking information. This information can then be retrieved later by querying the management device.

In one embodiment, the processing step includes an incrementation of a packet counter including marking information. This mode allows performing statistics on the packets emitted in offload mode.

Particularly, when the processing step includes an incrementation of a packet counter including complementary marking information constituted by an identifier of an administrative entity of the home access network, statistics obtained by this counter can be used for financial transfers between the administrative entity of the home network and the administrative entity of the additional network.

According to another example, when the processing step includes an incrementation of a packet counter including complementary marking information of the type "a reason for using the additional access network", statistics obtained by this counter can be used to:
  analyze behaviors or choices of the users of the terminals and therefore to propose adequate services for these users. Indeed, a terminal can emit packets in offload mode because it is configured in airplane mode, or because it is configured to prefer the additional network, or because the consumption on the home network has reached a certain threshold;
  analyze the performances of the home access network. Indeed, a terminal can emit packets in offload mode because the home network is not available, or the quality of service offered by the home network is not satisfactory, or due to a synchronization problem between the terminal and a home network access point.

In one embodiment, the processing step includes a deletion of the primary marking information and/or of the complementary marking information. This mode is adapted for a local processing of the packets, at the management device in accordance with the invention, without disclosing the marking information to the other devices through which the packet passes until it arriving to the recipient device.

In one embodiment, the processing step includes a modification of the primary marking information and/or of the complementary marking information. This mode can be implemented to ensure compatibility during passage of the packet from one network to another, these two networks not using the same format of the marking information.

In one embodiment, the processing step includes an application of a method for differentiating traffic in quality of service based on the primary marking information. For example, the management device can process the packets emitted in nominal mode in a privileged way than the packets emitted in offload mode: by placing them in priority or shorter queues, or by transiting them on a communications channel with better performances (in terms of signal-to-noise ratio for example), or by transiting them towards faster routes, etc.

In one embodiment, the processing step includes an application of a method for differentiating traffic in quality of service based on the primary marking information and on the complementary marking information.

For example, when the complementary marking information includes a reason for using the additional access network, the management device in accordance with the invention may favor:
firstly the packets emitted in nominal mode, these packets being distinguished because they do not include primary marking information,
secondly the packets emitted in offload mode due to a loss of connection to the home network,
and lastly the packets emitted in offload mode due to a degradation of performances of connection to the home network.

According to another example, when the complementary marking information includes an identifier of the home access network, a management device in accordance with the invention and managing traffic of a WiFi access network can process the packets emitted in offload mode by favoring the packets indicating that the home network is a wired access network (packets emitted by computers for example), over packets indicating that the home network is a cellular network (packets emitted by mobile telephones for example). This embodiment allows a priori favoring professional users.

According to another example, when the complementary marking information includes an identifier of an administrative entity managing the home access network, the processing step may include a differentiation of the packets emitted by the same administrative entity managing the management device in accordance with the invention. For example, when the management device belongs to a determined operator, it can favor the packets emitted in offload by telephones having SIM cards from the same operator.

In one embodiment, the processing step includes an IP DSCP (Differentiated Service Code Point) type marking. This mode allows notifying nodes placed downstream of the management device, a priority level associated with the packet and/or another processing to be applied to the packet.

In one embodiment, the processing step includes an application of a charging method based on the primary marking information, or on the primary marking information and the complementary marking information.

In one embodiment, the processing step includes an application of a routing method based on the primary marking information, or on the primary marking information and the complementary marking information. The routing method may include a switching of the packets towards different paths based on their marking information.

In one embodiment, the processing step includes a storage of session parameters during which the packet is received, to identify at least one response packet emitted by the recipient device to the terminal. This mode allows applying a specific processing to the packets of response to marked packets emitted by the terminal in accordance with the invention. Particularly, the processing applied to the response packets can be identical to the processing of the packets emitted by the terminal.

In one embodiment, the differentiation method further comprises steps of:
obtaining configuration data, from an application programming interface of the terminal;
obtaining the primary marking information and/or the complementary marking information from the configuration data.

Thus, the invention allows the user of the terminal to choose, via the application programming interface, to apply the marking of the packets that his terminal emits or not in offload mode.

Also, the invention allows the user to specify the marking information.

In one embodiment, the application programming interface of the terminal is firmware software installed on the terminal. The user of the terminal, in accordance with the invention, can configure his terminal directly and implicitly via this firmware software to implement or not the differentiation method, in accordance with the invention.

In another embodiment, the application programming interface of the terminal is a communications interface between the terminal and a "Device Management" or "Entitlement server" type server. The terminal is dynamically and explicitly configured by means of this server to implement or not the differentiation method, in accordance with the invention.

The implementation or not of the differentiation method, in accordance with the invention, by a terminal in accordance with the invention may result from a choice of the manufacturer of the terminal, this choice being able to be modified by the user.

The implementation or not of the differentiation method, in accordance with the invention, by a terminal in accordance with the invention may result from a choice of the access provider for an access network, for example based on:
a service to which the user of the terminal is subscribed;
a segmentation of clients of the provider (residential markets or companies);
a location of the terminal (for example a telephone connected to a Home mobile network managed by the access provider, or to a Host visited mobile network managed by another provider);
a type of traffic (it is possible to configure the terminal to implement the method of the invention only for packets emitted by a VoIP application for example); and/or
a detection of an SSID (Service Set Identifier) Identifier of a WiFi access network (indeed, it is possible to configure the terminal to implement the differentiation method for a certain WiFi network and not another).

In one embodiment, the packet is of IPv4 type, the first field being the field "type of IP service" and the second field being the field "IP options".

In another mode, the packet is of IPv6 type, the first and second fields being fields of "IP extension header" type.

Thus, the invention is compatible with the IPv4 and IPv6 protocols, and can therefore be easily implemented by terminals and devices currently available on the market with minor modifications to insert, retrieve and process the marking information.

Also, the invention can be used to mark traffic of different applications, such as the web browsing applications, the mail applications, the FTP (File Transport Protocol) applications, the TV applications, the VoD (Video on Demand) applications, the VoIP (Voice over IP) applications, etc. Indeed, the marking information is inserted at the IP headers and does not affect the data of these applications integrated into the bodies of the packets.

Also, the invention is compatible with the MPTCP aggregation protocol.

Also, the invention can be compatible with the combinatorial tunnel mechanisms, allowing switching from one protocol among the IPv4, IPv6 and GTP (GPRS Tunneling Protocol) protocols to another.

The invention is also compatible with the security mechanisms of the state of the art, such as the IPSec (Internet Protocol Security), sRTP (Secured Real Time Protocol), SIPS (Session Initiation Protocol Secured), HTTPS (Hyper Text Transfer Protocol Secured), and TLS (Transport Layer Security) protocols.

It should be noted that the retrieval, the modification or the deletion of a marking information does not penalize the latency in conveying the packets because in any case, the IP headers are handled for NAT (Network Address Translation) type functionalities, a replacement of an IP address, or a port or a recalculation of a checksum type information.

It should also be noted that the impact of the invention on the MTU (Maximum Transmission Unit) criteria is not penalizing. It is recalled that the MTU criteria relate to the maximum size of a packet that can be transmitted at one time. Indeed, the primary marking information can consume a single bit to distinguish the packets emitted via the home network from the packets emitted via the additional network. The number of bits used to insert the complementary marking information is also limited, according to a maximum number of all possible complementary information.

It is recalled that the field "Type of service" of an Ipv4 packet has 8 bits whose only 6 bits are currently used by methods of the state of the art. One of the two remaining bits can be used to transport the primary marking information in accordance with the invention. The size of the IP packet is not increased. In addition, the majority of the equipment of the state of the art already processes this field "Type of service". However, the size of this field does not allow passing additionally the complementary information defined in this invention application.

In the mode (described previously) where the complementary marking information is inserted in the field "IP options" of an IPv4 packet, it is possible to use an option class reserved for later use (the classes 1 and 3 for example) and create a new option "Offload" in one of these classes. It is also possible to create the new "Offload" option in an already existing class (classes 0 and 2 for example).

In one embodiment, the terminal in accordance with the invention implements the differentiation method, in accordance with the invention, for all the packets it emits via the additional network.

In another mode, the terminal in accordance with the invention implements the differentiation method only for some packets it emits via the additional network, for example, exclusively for a determined number of the first IP packets of the same IP session. It is recalled that an IP session is based on a source IP address, an emission port, a destination IP address, a destination port and a transport protocol.

In this mode, the management device processes all the packets of the same IP session in the same way. Indeed, once the IP session is established, when the management device in accordance with the invention detects marking information on a first packet of the session, it can deduce that the packets of the same session are also emitted by the same terminal via its additional access network.

The management device in accordance with the invention may include:
the recipient device;
a device of said additional access network;
network termination equipment, such equipment is marketed in France under the name "box" offering multiple services, such as LiveBox equipment (product marketed by Orange);
an access point for a cellular access network, such as an eNodeB-type antenna;
a router; or
a platform for providing a service.

Similarly, those skilled in the art can apply the differentiation method in accordance with the invention, to differentiate traffic emitted by an access point or a gateway capable of emitting packets on different interfaces WAN. This access point or this gateway can insert in a field of a packet to be emitted, marking information including a type or an identifier of the interface WAN used to emit this packet.

The invention is also aimed at a system for managing traffic emitted by a terminal in accordance with the invention. This system includes the terminal and at least one management device in accordance with the invention.

The invention is also aimed at a first computer program on a recording medium, this program being likely to be implemented in a computer or a terminal in accordance with the invention. This program includes instructions adapted to the implementation of a traffic differentiation method as described above.

The invention is also aimed at a second computer program on a recording medium, this program being likely to be implemented in a computer or a management device in accordance with the invention. This program includes instructions adapted to the implementation of a management method as described above.

Each of these programs can use any programming language, and be in the form of source code, object code, or intermediate code between source code and object code, such as in a partially compiled form, or in any other desirable form.

The invention is also aimed at an information medium or a recording medium readable by a computer, and including instructions of the first or of the second computer program as mentioned above.

The information or recording media can be any entity or device capable of storing the programs. For example, the media can include a storage means, such as a ROM, for example a CD ROM or a microelectronic circuit ROM, or a magnetic recording means, for example a floppy disk or a hard disk, or a flash memory.

On the other hand, the information or recording media can be transmissible media such as an electrical or optical signal, which can be conveyed via an electrical or optical cable, by radio link, by optical wireless link or by other means.

The programs according to the invention can be particularly downloaded from an Internet-type network.

Alternatively, each information or recording medium can be an integrated circuit in which a program is incorporated, the circuit being adapted to execute or to be used in the execution of the response method in accordance with the invention or of the method for providing a response element in accordance with the invention.

BRIEF DESCRIPTION OF THE DRAWINGS

Other characteristics and advantages of the present invention will emerge from the description given below, with reference to the appended drawings which illustrate an exemplary embodiment thereof without any limitation. In the figures:

FIG. 1, already described, illustrates an architecture of a network of the prior art supporting the MPTCP protocol;

FIG. 2, already described, illustrates a software architecture of a terminal of the prior art, which can simultaneously connect to several access networks;

FIG. 3 illustrates an architecture of a network in which the methods of the invention are implemented according to a first embodiment of the invention;

FIG. 4 is a flowchart representing steps of a differentiation method, in accordance with the invention, implemented according to one embodiment;

FIG. 5 is a flowchart representing steps of a traffic management method, in accordance with the invention, implemented according to one embodiment;

FIG. 6 presents functional architectures of a management system, of a terminal and of a management device, in accordance with the invention;

FIG. 7 presents a hardware architecture of a terminal according to one embodiment of the invention; and FIG. 8 presents a hardware architecture of a management device according to one embodiment of the invention.

DESCRIPTION OF THE EMBODIMENTS

FIG. 3 illustrates an architecture of a network NET in which the methods of the invention are implemented according to one embodiment of the invention.

The network NET includes an access network LAN2 of ADSL technology, a metropolitan area network MAN and a core network CAN. These three networks LAN2, MAN and CAN are managed by the same administrative entity. The core network CAN is connected to the Internet network via a router RTR-A, and to an extranet network via a router RTR-B. The Internet and Extranet networks are also comprised in the network NET. Service platforms P-SRV1, P-SRV2 and P-SRV3 are respectively connected to the Internet, extranet and CAN networks. The architecture of the network NET is similar to a network of the prior art.

A terminal TRM, in accordance with the invention, can be connected simultaneously to the access network LAN2 and to another access network LAN1. In this example, the terminal TRM is a Smartphone-type telephone; the network LAN1 is a cellular access network. The network LAN1 constitutes a home network, within the meaning of the invention, for the terminal TRM, while the network LAN2 constitutes an additional network, within the meaning of the invention, for the terminal TRM.

An access point PA comprised in the network LAN2, allows the terminal TRM to communicate with the network LAN2 and thus the network NET. In this example, the access point PA is a network termination equipment, commercially known in France by the name "box". It has a wired connection interface and a WiFi connection interface. This access point constitutes a management device in accordance with the invention.

The software architecture of the terminal TRM is of the architecture type illustrated in FIG. 2.

FIG. 4 is a flowchart representing steps of a traffic differentiation method, in accordance with the invention, implemented by the terminal TRM, in accordance with the invention and described with reference to FIG. 3.

During a step E400, the terminal TRM checks in a queue if it has any packets to emit. It is assumed here that there is a packet P in this queue and that the terminal TRM supports the IPv4 protocol.

During a step E410, the terminal obtains information from its selection module, to determine whether it sends the packet P to its destination via the home access network LAN1, or the additional access network LAN2.

If the information obtained from the selection module indicates that the packet must be sent via the home network LAN1, the terminal TRM sends during a step E420 the packet P to its destination via the network LAN1.

If the information obtained from the selection module indicates that the packet must be sent via the additional network LAN2, the terminal TRM obtains during a step E430 configuration information info-conf from an application programming interface (API) of this terminal. In the mode described here, this configuration information info-conf includes a command for marking the packets sent via the additional network LAN2.

During a step E432, the terminal TRM obtains primary marking information, iMARK. In this mode, the information iMARK is obtained from the configuration information info-conf and it includes information to be inserted in the packet P to indicate that it is emitted by the terminal TRM via the additional network LAN2.

During a step E434, the terminal TRM obtains at least one complementary marking information, iMARK'. In this mode, the information iMARK' is obtained from the selection module, and it includes information on the reason why the selection module has selected the additional network LAN2.

Both steps E432 and E434 can be implemented simultaneously, or one after the other, regardless of which one precedes the other.

During a step E436, the terminal TRM inserts the primary marking information iMARK in the header of the packet P in the field "type of IP service" in accordance with the IPv4 protocol.

During a step E438, the terminal TRM inserts the complementary marking information iMARK' in the header of the packet P in the field "IP options" in accordance with the IPv4 protocol.

Both steps E436 and E438 can be implemented simultaneously, or one after the other, regardless of which one precedes the other.

During a step E440, the terminal TRM sends the packet P, including the information iMARK and iMARK' in its header, to its destination via the additional access network LAN2.

The packet P will be then received firstly by the access point PA, described with reference to FIG. 3. It is assumed in this example that the destination of this packet P is the service platform P-SRV1, and that the packet P will be routed from the access point PA to the router RTR-A, via the network MAN then the network CAN. The packet P is then routed by the router RTR-A to the platform P-SRV1 via the Internet network.

FIG. 5 is a flowchart representing steps of a traffic management method, in accordance with the invention, implemented by the access point PA, in accordance with the invention and described above.

During a step E500, the access point PA checks in an input queue whether it has received a packet. It is assumed that in this example, the access point PA receives the packet P sent by the terminal TRM via its additional access network LAN2.

During a step E510, the access point PA checks whether the received packet includes primary marking information. If the packet does not include such information, the access point PA deduces that this received packet was sent by a terminal via its home network. In this case, the access point PA sends the packet to its destination, during a step E550, in accordance with the state of the art.

In this example, the received packet P effectively includes the information iMARK inserted (E436) by the terminal TRM. The access point PA therefore checks, during a step E520, whether the received packet P also includes complementary marking information.

In the example described here, the packet P effectively includes the information iMARK' inserted (E438) by the terminal TRM. Thus, during a step E530, the access point PA processes the packet P based on the two pieces of information iMARK and iMARK'.

In the mode described here, the processing step E530 includes an incrementation of a first counter C1 of packets received by the access point PA and including primary marking information and an incrementation of a second counter C2 of packets received by the access point PA and including complementary marking information identical to the information iMARK', that is to say packets sent by their emitter terminals via their additional networks for the same reason as that of the terminal TRM.

Alternatively, the access point PA may not detect, during step E520, complementary information in the header of the received packet. In this case, the access point PA processes the packet received during a step E540 based on the primary marking information iMARK only. The processing (E540) can include an incrementation of the counter C1.

Following one of the processing steps E530 or E540, the access point sends the packet P, during step E550 to its destination P-SRV1.

In the mode described here, the router RTR-A also constitutes a management device in accordance with the invention. When it receives the packet P, it implements the steps of the management method described with reference to FIG. 5. The steps E530 and E540 of processing the packets including marking information iMARK and possibly iMARK', may include an incrementation of counters as described above, or a modification or a deletion of a marking information, or a selection of a routing path to the destination P-SRV1 of the packet P according to the marking information it includes. These actions can also be implemented through the access point PA.

In the mode described here, the service platform P-SRV1 also constitutes a management device in accordance with the invention. When it receives the packet P, it implements the steps of the management method described with reference to FIG. 5. The steps E530 and E540 of processing the packets including marking information iMARK and possibly iMARK' may include one of the actions already described previously (for the access point PA or the router RTR-A). The service platform P-SRV1 can adapt the characteristics of the service it offers to the terminal TRM based on the access network LAN1 or LAN2 used, for example by using video encoders of a quality determined based on a type of the network (cellular or WiFi network) used.

In a similar way to the differentiation method implemented by the terminal TRM, the access point PA can insert marking information in a packet P it emits, this marking information including a type or an identifier of an interface WAN used to convey this packet P to its destination. Indeed, the access point PA can be connected to a network WAN via different means, for example through fiber optic and ADSL link. In addition, the access point can include multiple interfaces WAN of the same technology.

The following table illustrates, by way of example, an implementation of a new "offload" option which can be integrated into the field "IP option" in accordance with the IPv4 protocol.

The encoding of the "Offload" option could for example be defined as option number 10 in the option class 0 of the state of the art and its encoding could be of the TLV (Type, Length, Value) type.

TABLE 1

| Type (1 octet) | Length (1 octet) | Value (1 octet) | Comments |
| --- | --- | --- | --- |
| 0-Offload | 1 | 0 | traffic in nominal mode |
|  |  | 1 | traffic in offload mode |
| 1-MCC | 1 | 0 to 255 | According to the country code defined by the 3GPP |
| 2-MNC | 1 | 0 to 255 | According to the operator code assigned by the 3GPP |
| 3-Home access network type | 1 | 0 | Cellular radio |
|  |  | 1 | xDSL |
|  |  | 2 | Fiber |
|  |  | 3 | Cable |
|  |  | 4 | Satellite |
|  |  | ... | ... |
| 4-Reason for using the additional network | 1 | 0 | Airplane mode |
|  |  | 1 | Poor quality of the home network |
|  |  | 2 | Synchronization loss |
|  |  | 3 | Preferred additional network |
|  |  | 4 | data Bucket reached |
|  |  | 5 | Aggregation (MPTCP) |
|  |  | ... | ... |
| 5-Visited cellular country | 1 | 0 to 255 | According to the country code defined by the 3GPP |
| 6-Visited cellular Operator | 1 | 0 to 255 | According to the operator code assigned by the 3GPP |

In the example of Table 1, the primary marking information in accordance with the invention corresponds to the code of type "0" and value "1", this code constitutes an indication that the packet is intended to be sent via the additional network. Indeed, the type "0" allows distinguishing a packet intended to be sent via the home network (the value being "0"), from a packet intended to be sent via the additional network (the value being "1"). Thus, the primary marking information is information that the terminal has decided to send the packet via the additional access network, this decision not being based on the marking information itself.

In this example, the codes of the types 1 to 6, including all their possible values, constitute complementary marking information within the meaning of the invention.

In one embodiment, the processing step E530 implemented by the access point PA includes an addition of complementary information iMARK'. The following table illustrates, by way of example, an encoding of the new "Offload" to implement the information added by the access point.

TABLE 2

| Type (1 octet) | Length (1 octet) | Value (1 octet) | Comment |
|---|---|---|---|
| 20-Type of the interface WAN taken by the packet P | 1 | 0 | ADSL |
| | | 1 | VDSL |
| | | 2 | FTTH |
| | | 3 | Cellular 2G |
| | | 4 | Cellular 3G |
| | | 5 | Cellular 4G |
| | | 6 | Cellular 5G |
| | | 7 | Cable |
| | | 8 | Satellite |
| | | ... | ... |
| 21-Synchronization rate of the interface WAN | 1 | 0 | <=10 Kbit/s |
| | | 1 | <=100 Kbit/s |
| | | 2 | <=1 Mbit/s |
| | | 3 | <=2 Mbit/s |
| | | 4 | <=3 Mbit/s |
| | | 5 | <=4 Mbit/s |
| | | 6 | <=5 Mbit/s |
| | | ... | ... |
| 22-type of the connection interface with the terminal TRM | 1 | 0 | Undetermined |
| | | 1 | Ethernet 100 Mbit/s |
| | | 2 | Ethernet 10 Mbit/s |
| | | 10 | WiFi a |
| | | 11 | WiFi b |
| | | 12 | WiFi g |
| | | 13 | WiFi n |
| | | 14 | WiFi a/c |
| | | 50 | Bluetooth |
| | | ... | ... |

In the example of Table 2, the codes of the types 20 to 22, whatever their values, constitute complementary marking information within the meaning of the invention.

The marking information, defined with reference to the IPv4 protocol in the two tables, can also be encoded in a field "Options" of a header of an IPv6 packet, for example the header "HopByHopHeader" or the header "DestinationOptionsHeader".

It should be noted that the marking information, inserted in the header of an IP packet must be taken into account for the calculation of the checksum field.

In one embodiment, the access point PA is an eNodeB-type antenna.

FIG. 6 represents functional architectures, according to one embodiment of the invention, of a traffic management system SYS, of a terminal TRM and of a management device PA (or RRH or RTR-A), the system SYS, the terminal TRM and the management device all conforming to the invention.

The system SYS includes the terminal TRM and the management device PA, RTR-A, P-SRV1.

The terminal TRM includes:
a module MRK1 for processing emitted traffic, this module MRK1 being configured to insert the primary marking information iMARK in a first field of a packet P, when this packet P is intended to be sent via the additional access network LAN2; and
communication means COM configured to send the packet P to a recipient device P-SRV1 via the additional access network LAN2.

In the mode described here, the processing module MRK1 is further configured to insert the complementary marking information iMARK' in a second field of the packet P.

The device PA, RTR-A, P-SRV1 for managing data traffic emitted by the terminal TRM includes:
communication means COM configured to receive the packet P from the terminal TRM, having been sent via the additional access network LAN2 and being intended for a recipient device P-SRV1;
detection means DTC configured to detect the primary marking information iMARK in a first field of the packet P, and optionally the complementary marking information iMARK' in a second field of the packet P; and
a processing module PROC configured to process the packet P based on the marking information iMARK (and possibly on the information iMARK');
the communication means COM being further configured to send the packet P to the recipient device P-SRV1.

In the embodiment described here, the terminal TRM has the hardware architecture of a computer, as illustrated in FIG. 7.

The architecture of the terminal TRM comprises in particular a processor 7, a random access memory 8, a read only memory 9, a non-volatile flash memory 10 in a particular embodiment of the invention, as well as communication means 11. Such means are known per se and are not described in more detail here.

The read only memory 9 of the terminal TRM according to the invention is constitutes a recording medium in accordance with the invention, readable by the processor 7 and on which a computer program ProgTx in accordance with the invention is here recorded.

The memory 10 of the terminal TRM allows recording the variables used for executing the steps of the differentiation method according to the invention, such as the packet P, the marking information iMARK, iMARK' and the configuration information info-conf.

The computer program ProgTx defines functional and software modules here, configured to differentiate traffic emitted by the terminal TRM. These functional modules rely on and/or control the hardware elements 7-11 of the terminal TRM mentioned above.

In the embodiment described here, the management device PA, RTR-A, P-SRV1 has the hardware architecture of a computer, as illustrated in FIG. 8.

The architecture of the management device PA, RTR-A, P-SRV1 comprises in particular a processor 7, a random access memory 8, a read only memory 9, a non-volatile flash memory 10 in a particular embodiment of the invention, as well as communication means 11. Such means are known per se and are not described in more detail here.

The read only memory 9 of the management device PA, RTR-A, P-SRV1 according to the invention constitutes a recording medium in accordance with the invention, readable by the processor 7 and on which a computer program ProgRx in accordance with the invention is here recorded.

The memory 10 of the management device PA, RTR-A, P-SRV1 allows recording variables used for executing the steps of the management method according to the invention, such as the packet P and the marking information iMARK, iMARK'.

The computer program ProgRx defines functional and software modules here, configured to manage traffic emitted by the terminal TRM. These functional modules rely on and/or control the hardware elements 7-11 of the management device PA, RTR-A, P-SRV1 mentioned above.

The invention claimed is:

1. A method for differentiating traffic, the method comprising:
determining, by a terminal configured to be connected to an access network including a home access network and an additional access network different from the home network, that a data packet is to be sent via the additional access network;

inserting, by the terminal, a primary marking information in a first field of the data packet, the primary marking information being representative of the use of the additional access network as an alternative access network to the home access network to emit traffic;

inserting, by the terminal, a complementary marking information in a second field of the data packet, the complementary marking information being representative of a reason for using the additional access network:

sending, by the terminal, the data packet to a recipient device via the additional access network, and detecting, by an intermediate network device of the additional access network located between the terminal and the recipient device, the primary marking information and the complementary marking information in the data packet, wherein the primary and the complementary marking information allows an access provider or an administrative entity managing the access network to adapt a quality of service offered by the access network or to provide new services based on statistics performed on data packets emitted via the home access network or via the additional access network.

2. The method of claim 1, further comprising:

obtaining, by the terminal, configuration data, from an application programming interface of the terminal;

obtaining, by the terminal, at least one marking information among said primary information and said complementary information from the configuration data.

3. The method of claim 1, further comprising:

obtaining, by the intermediate network device, the complementary marking information, and processing, by the intermediate network device, the data packet based on said complementary marking information.

4. The method of claim 3, wherein the complementary marking information further includes at least one information among:

a type of the home access network;

an identifier of the home access network;

an identifier of the country of the home access network; and an identifier of an administrative entity of the home access network.

5. The management method of claim 3, wherein processing the data packet includes at least one action among:

a storage of the primary marking information and/or of the complementary marking information;

an incrementation of a packet counter including marking information;

a deletion or a modification of the primary marking information and/or of the complementary marking information;

an application of a method for differentiating traffic in quality of service based on the primary marking information, or based on the primary marking information and the complementary marking information;

an IP DSCP type marking;

an application of a routing method based on the primary marking information, or based on the primary marking information and the complementary marking information; and a storage of session parameters during which the packet is received, to identify at least one response packet emitted by the recipient device to the terminal.

6. The method of claim 1, wherein the packet is of IPV4 type, the first field being the field "type of IP service" and the second field being the field "IP options".

7. The method of claim 1, wherein the packet is of IPV6 type, the first and second fields being fields of the "IP extension header" type.

8. A non-transitory computer readable data medium having stored thereon instructions which, when executed by a processor, cause the processor to implement the method of claim 1.

9. The method of claim 1, wherein the reason for using the additional access network comprises at least one among:

an activation of an airplane mode, a poor quality of the home access network, a synchronization loss with the home access network, an instruction to aggregate traffic carried over the home and the additional access network, and a data bucket reached.

10. A system including a terminal and an intermediate network device, the terminal configured to be connected to an access network including an home access network and an additional access network different from the home network, the terminal comprising a processor configured to:

determine that a data packet is to be sent via the additional access network;

insert a primary marking information in a first field of the data packet, the primary marking information being representative of the use of the additional access network as an alternative access network to the home access network to emit traffic;

insert a complementary marking information in a second field of the data packet, the complementary marking information being representative of a reason for using the additional access network; and send the data packet to a recipient device via the additional access network, the intermediate network device comprising a processor configured to:

detect the primary marking information and the complementary marking information in the data packet, wherein the primary and the complementary marking information allows an access provider or an administrative entity managing the access network to adapt a quality of service offered by the access network or to provide new services based on statistics performed on data packets emitted via the home access network or via the additional access network.

11. The system of claim 10, wherein the intermediate network device is further configured to:

obtain the complementary marking information, and process the data packet based on the complementary marking information.

12. The system of claim 10, including:

the recipient device;

a network termination equipment;

an access point for a cellular access network; a router; or a platform providing a service.

* * * * *